Patented July 17, 1928.

1,677,529

UNITED STATES PATENT OFFICE.

ALFRED POLLAK, OF VIENNA, AUSTRIA.

MANUFACTURE OF YEAST, ESPECIALLY BY THE AERATION PROCESS.

No Drawing. Application filed March 23, 1923, Serial No. 627,145, and in Austria April 4, 1922.

The invention relates to the production of yeast especially by the areation method.

The process consists essentially in adding to the mash or wort at that period of the yeast development, at which the reproduction has considerably slowed down, a second portion of culture yeast whose assimilative properties for nitrogenous compounds had been increased by subjecting the yeast to a treatment with solutions containing in addition to albumin digesting enzymes also enzymes capable of decomposing hemicellulose.

The first part of the culture yeast, to be added to the wort at the beginning, is cultivated in known manner and is added in the usual proportion, whereupon the wort is allowed to ferment in the usual manner. When the reproduction of the yeast begins to slow down or ceases completely, the second portion of culture yeast is introduced into the fermenting mass, this second portion having been pretreated in a special manner.

In order to increase the assimilative capability of the yeast cell for nitrogenous nutrients, the yeast can, according to the present invention, be pretreated in various ways.

It has first been found, that said capacity of the yeast cell can be increased by subjecting the yeast without causing any fermentation at moderate temperature to the action of solutions, which, in addition to enzymes adapted to digest albumin, contain also enzymes adapted to decompose hemicellulose. Such enzyme mixtures may for example be found in germinated cereals and legumens, in the contents of the stomach of ruminant animals, in pancreatine, in solutions obtained from mortified yeast or in the products secreted by fungi of the genus Aspergillus or Mucor.

It has moreover been ascertained, that the capability of the yeast of utilizing less suitable nitrogenous compounds for building up its cell substance may also be increased by cultivating the starting yeast in a medium enriched with metabolic products separated from other micro-organisms capable of causing fermentation during their active life or with the autolysates of such micro-organisms for the purpose of acclimatizing the yeast to such metabolic products. Particularly suitable additions of this kind are for instance the products of fermentation formed by fungi of the genus Aspergillus or Mucor, which are distinguished by their large contents in soluble enzymes and various decomposition products. Of the species suitable for this purpose may, only by way of examples, be named: *Aspergillus oryzae*, *Mucor rouxii*, and in general the species called *amylomyces*.

In this connection it should be pointed out, that also in the course of the first-mentioned treatment of yeast at moderate temperature with solutions containing besides albumin-digesting enzymes also hemi-cellulose-decomposing enzymes, in which treatment a fermentation does not take place, products of decomposition are formed which are effective in the same sense as the metabolic products of micro-organisms other than yeast (for example of the fungi of the genus Aspergillus and Mucor) hereinbefore proposed for use as additions in the aforesaid preliminary fermentation for the purpose of acclimatizing the yeast to said products.

According to a preferred method of carrying out the invention for the second portion a culture yeast is used which has originally been subjected to a preliminary treatment with suitable solutions at moderate temperature without any fermentation and subsequently to a preliminary fermentation taking place in the presence of metabolic products or autolysates of other micro-organisms provoking fermentation, both methods of treating the culture yeast for the purpose of increasing its assimilative capacity being thus combined.

Finally the last specified variation of the process may be carried out by adding for the second part of the preliminary treatment that is for the preliminary fermentation, substances which have been secreted by the yeast itself during prior fermentation as products of its active life. Suitable additions of this kind are for instance clear spent wash resulting from the manufacture of spirit or of yeast, this spent wash being either used as such or in a more concentrated state, or products of decomposition of yeast waste, formed by auto-digestion of the yeast or by treatment of the latter with acids.

Example: A quantity of culture yeast up to about one and a half to five percent calculated on the material used in making the mash is introduced as usual, into the fermentation vessel, or as an alternative, as is frequently done, is subjected to a preliminary fermentation in a concentrated medium. A second part of the culture yeast, in the same proportion or up to double the quantity as above, is treated at a temperature of about 30° centigrade for 3 to 6 hours with suitable enzyme containing solutions of the described kind and thereafter subjected to a separate preliminary fermentation, for which a considerably larger quantity of starting yeast is used, for example, for a certain weight of starting yeast only half of the regular quantity of wort, (about one twentieth part of the main mash) may be used. When distiller's spent-wash can be obtained, such liquid may be added to the preliminary mash. Spent-wash of yeast manufactured by the old Vienna process or any autolysate of yeast, or the fermentation products of the fungi of the genus Aspergillus or Mucor may be used for the same purpose. The solution of the enzymes may be introduced simultaneously with the other ingredients in the culture yeast vat, however care has to be taken, that in such case the solution of enzymes will be employed in a more dilute state. This preliminary fermentation must be initiated in good time and lively budding of the yeast must be brought about by abundant aeration, so that when the material thus prepared is introduced into the main mash or wort a lively activity immediately takes place, the nitrogenous nutrient which may still be present and not yet consumed by the first portion of the starting yeast being used for the reproduction and maturing of the specially cultivated cells, acclimatized on a medium containing separation products of the metabolism of yeast. During the preliminary fermentation too high a concentration of alcohol should be avoided and a sufficient amount of sugar should be left unattacked. This can be attained by adding the stimulating substances at the very start of the preliminary fermentation, but beginning the fermentation with a dilute sugar solution, while the remainder of this solution in a more or less concentrated state is added continuously to the starting vessel during the course of the preliminary fermentation.

I do not deem it necessary to give directions specifying the actual materials used in the illustrative example and the species of the yeast for the reason, that those skilled in the art are familiar with the requirements (manner of constituting the normal mash or wort employed in the manufacture of yeast) and that there is no necessity of choosing particular species of yeast for the process, and finally also for the reason, that the literature on this subject is old and well known.

I claim:

1. In the art of yeast manufacture the process of producing yeast which comprises preparing a yeast nutrient solution, propagating yeast therein with aeration and adding at the period of the yeast development, at which the reproduction has considerably slowed down a second portion of culture yeast whose assimilative properties for nitrogenous compounds had been increased by subjecting the yeast to a treatment with a solution containing in addition to albumin-digesting enzymes also enzymes capable of decomposing hemi-cellulose.

2. In the art of yeast manufacture the process of producing yeast which comprises preparing a yeast nutrient solution, propagating yeast therein with aeration and adding at the period of the yeast development, at which the reproduction has considerably slowed down a second portion of culture yeast whose assimilative properties for nitrogenous compounds had been increased by subjecting the yeast to a treatment with a watery solution obtained by extraction of germinated cereals.

3. In the art of yeast manufacture the process of producing yeast which comprises preparing a yeast nutrient solution, propagating yeast therein with aeration and adding at the period of the yeast development, at which the reproduction has considerably slowed down a second portion of culture yeast whose assimilative properties for nitrogeneous compounds had been increased by subjecting the yeast to a treatment with a solution containing in addition to albumin-digesting enzymes also enzymes capable of decomposing hemi-cellulose and thereafter to a preliminary fermentation in the presence of products formed during their active life by micro-organisms provoking alcoholic fermentation.

4. In the art of yeast manufacture the process of producing yeast which comprises preparing a yeast nutrient solution, propagating yeast therein with aeration and adding at the period of the yeast development, at which the reproduction has considerably slowed down a second portion of culture yeast whose assimilative properties for nitrogeneous compounds had been increased by subjecting the yeast to a treatment with a solution containing in addition to albumin-digesting enzymes also enzymes capable of decomposing hemi-cellulose, and thereafter to a preliminary fermentation in the presence of products formed by the yeast itself during its active life.

5. In the art of yeast manufacture the process of producing yeast which comprises preparing a yeast nutrient solution, propagating yeast therein with aeration and adding at the period of the yeast development, at which the reproduction has considerably slowed down a second portion of culture yeast whose assimilative properties for nitrogenous compounds had been increased by subjecting the yeast to a treatment with a solution containing in addition to albumin-digesting enzymes also enzymes capable of decomposing hemi-cellulose, and thereafter to a preliminary fermentation, spent-wash resulting from an alcoholic fermentation being added to the preliminary mash or wort.

6. In the art of yeast manufacture the process of producing yeast which comprises preparing a yeast nutrient solution, propagating yeast therein with aeration and adding at the period of the yeast development, at which the reproduction has considerably slowed down a second portion of culture yeast whose assimilative properties for nitrogeneous compounds had been increased by subjecting the yeast to a treatment with a solution containing in addition to albumin-digesting enzymes also enzymes capable of decomposing hemi-cellulose and thereafter to a preliminary fermentation, spent-wash resulting from yeast manufacture being added to the preliminary mash or wort.

In testimony whereof I have affixed my signature.

ALFRED POLLAK.